United States Patent
Tonsich

(10) Patent No.: US 12,385,422 B2
(45) Date of Patent: *Aug. 12, 2025

(54) EMISSION CONTROL SYSTEM FOR AUXILIARY DIESEL ENGINES

(71) Applicant: Clean Air-Engineering—Maritime, Inc., San Pedro, CA (US)

(72) Inventor: Nicholas G. Tonsich, San Pedro, CA (US)

(73) Assignee: Clean Air-Engineering—Maritime, Inc., San Pedro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,613

(22) Filed: Apr. 13, 2020

(65) Prior Publication Data

US 2020/0240302 A1 Jul. 30, 2020

Related U.S. Application Data

(62) Division of application No. 15/231,071, filed on Aug. 8, 2016, now Pat. No. 10,619,539.

(60) Provisional application No. 62/201,925, filed on Aug. 6, 2015.

(51) Int. Cl.
*F01N 3/021* (2006.01)
*F01N 13/00* (2010.01)

(52) U.S. Cl.
CPC .......... *F01N 3/021* (2013.01); *F01N 13/004* (2013.01); *F01N 2340/00* (2013.01); *F01N 2610/02* (2013.01); *Y02T 10/12* (2013.01)

(58) Field of Classification Search
CPC .............. F01N 13/004; F01N 2340/00; F01N 2610/02; F01N 3/021; Y02T 10/12
See application file for complete search history.

(56) References Cited

U.S. PATENT DOCUMENTS

| | | |
|---|---|---|
| 4,732,594 A | 3/1988 | Mizrah et al. |
| 5,013,340 A | 5/1991 | Taslim et al. |
| 5,426,936 A | 6/1995 | Levendis et al. |
| 5,595,581 A | 1/1997 | Ichikawa et al. |
| 6,022,389 A | 2/2000 | Vross et al. |

(Continued)

FOREIGN PATENT DOCUMENTS

| | | | |
|---|---|---|---|
| CN | 102812217 | * | 12/2012 |
| EP | 2955345 A1 | | 12/2015 |

(Continued)

OTHER PUBLICATIONS

Exhaust Treatment/Clean Air Engineering—Maritime; Jul. 30, 2015; retrieved on Nov. 9, 2016; https://web.archive.org/web20150730144033/http://caemaritime.com/what-we-do/exhaust-treatment/; 2pp.

*Primary Examiner* — Phutthiwat Wongwian
*Assistant Examiner* — Diem T Tran
(74) *Attorney, Agent, or Firm* — Avyno Law P.C.

(57) ABSTRACT

An emission control system is provided for diesel engines operated on ocean-going ships at-berth that may be easily installed and removed from on ocean-going ships (or vessels) while at-berth. The emission control system is arranged within a housing sized to fit within space allocated for standard shipping containers. The emission control system has an inlet for receiving exhaust from a ships engine, cleans the exhaust and then passes the exhaust through an exhaust outlet connected to the ships stacks.

14 Claims, 6 Drawing Sheets

(56) References Cited

U.S. PATENT DOCUMENTS

| | | |
|---|---|---|
| 6,989,045 B2 | 1/2006 | Bailey et al. |
| 7,258,710 B2 | 8/2007 | Caro et al. |
| 7,269,942 B2 | 9/2007 | Bailey |
| 7,275,366 B2 | 10/2007 | Powell et al. |
| 7,503,170 B2 | 3/2009 | Dubots et al. |
| 7,842,264 B2 | 11/2010 | Cooper et al. |
| 8,075,651 B2 | 12/2011 | Caro et al. |
| 8,327,631 B2 | 12/2012 | Caro et al. |
| 8,590,474 B2 | 11/2013 | Roodenburg et al. |
| 8,857,635 B2 | 10/2014 | Weckbecker et al. |
| 9,089,806 B2 | 7/2015 | Powell et al. |
| 9,155,994 B2 | 10/2015 | Theis et al. |
| 10,556,204 B2 | 2/2020 | Richardson |
| 10,570,795 B2 | 2/2020 | Kawaguchi et al. |
| 2003/0110763 A1 | 6/2003 | Pawson et al. |
| 2004/0020364 A1 | 2/2004 | Koclejda et al. |
| 2005/0244318 A1 | 11/2005 | Caro et al. |
| 2006/0021319 A1 | 2/2006 | Russell et al. |
| 2006/0213197 A1 | 9/2006 | Caro et al. |
| 2007/0209544 A1 | 9/2007 | Caro et al. |
| 2010/0018055 A1 | 1/2010 | Fynderup et al. |
| 2010/0180559 A1 | 7/2010 | Caro et al. |
| 2011/0011261 A1 | 1/2011 | Jenness et al. |
| 2011/0243822 A1 | 10/2011 | Mortson |
| 2011/0265449 A1 | 11/2011 | Powell et al. |
| 2012/0102929 A1 | 5/2012 | Beissler et al. |
| 2012/0143445 A1 | 6/2012 | Morath |
| 2013/0096799 A1 | 4/2013 | Horne |
| 2014/0083791 A1 | 3/2014 | Togo |
| 2014/0090379 A1 | 4/2014 | Powell et al. |
| 2015/0007719 A1 | 1/2015 | Langh |
| 2015/0159537 A1 | 6/2015 | Ludeman et al. |
| 2015/0231567 A1 | 8/2015 | Golin et al. |
| 2016/0010002 A1 | 1/2016 | Norling |
| 2018/0154309 A1 | 6/2018 | Patterson et al. |

FOREIGN PATENT DOCUMENTS

| | | | |
|---|---|---|---|
| KR | 20170049836 | * | 5/2017 |
| TW | 201339409 A | | 10/2013 |
| WO | 2008092964 A1 | | 8/2008 |

* cited by examiner

EMISSION CONTROL SYSTEM FOR AUXILIARY DIESEL ENGINES

RELATED APPLICATIONS

This application is a divisional of U.S. patent application Ser. No. 15/231,071, filed on Aug. 8, 2016, titled EMISSION CONTROL SYSTEM FOR AUXILIARY DIESEL ENGINES, which application claims priority of U.S. Application Ser. No. 62/201,925, filed on Aug. 6, 2015, titled EMISSION CONTROL SYSTEM FOR AUXILIARY DIESEL ENGINES, both applications of which are incorporated in their entirety by reference in this application.

FIELD OF THE INVENTION

The invention relates to an emission control system, and in particular, an airborne toxic control system, for auxiliary diesel engines operated on ocean-going ships (or vessels) at-berth.

BACKGROUND OF THE INVENTION

The California Air Resources Board ("CARB") has adopted a regulation commonly called the at-berth regulation, the purpose of which is to reduce emissions from diesel auxiliary engines on container ships, passenger ships and refrigerated-cargo ships while berthing at a California Port, which the regulation defines as the Ports of Los Angeles, Long Beach, Oakland, San Francisco and Hueneme. The at-berth regulation provides ship fleet operators visiting these ports two options to reduce at-berth emissions from auxiliary engines: (1) turn off auxiliary engines and connect the ship to some other source of power, most likely grid-based shore power; or (2) use alternative control technique (s) that achieve equivalent emission reductions.

Current options for connecting to alternative power sources are often cumbersome and expensive, and are sometimes not available for one or more of the following reasons: (i) ships are not wired for shore power; (ii) shipping companies do not want the expense of converting to shore power; (iii) terminals have no shore power available; or (iv) shore power is over-stressed and is unable to provide for additional demand.

Currently, few or no alternative control techniques are available that achieve equivalent emission reductions. Thus, a need exists for affordable alternatives to shore power connections. Absent such an economical solution, some ships will be unable to dock at major ports in California or other ports imposing similar restrictions on admissions, thus adversely affecting shippers' businesses. In addition, ports subject to the CARB at-berth regulation, or other similar restrictions, will also be adversely affected. Not only will they lose business from ships that do not or cannot comply with applicable restrictions or regulations, but also they will also be hindered in expanding business by attracting ships to dock that are similarly non-compliant.

SUMMARY

An emissions control system is provided that allows a ship at-berth to operate its auxiliary diesel engine or its engines with reduced emissions. As such, the emission control system allows for compliance with applicable regulations and/or restrictions on emissions, such as the requirements of the CARB regulation. The present invention provides an efficient, economical and regulatory-compliant alternative to shore power (i.e. an Alternative Maritime Power Equivalent) at-berths for ocean-going ships that cannot or choose not to use shore power. Moreover, the invention is useful even where a ship is not regulated for shore power, but would like to operate with minimal environmental impacts. The control system of the present invention ties directly into the duct system between the auxiliary diesel engine(s) of a ship and its stacks.

In one example of the invention, an emissions control system that is capable of controlling emissions is positioned within a housing that has the same size as a three-high standard shipping container, allowing it to be loaded and unloaded from the ship using the same hoists as are used for regular shipping containers, facilitating installation and removal, if necessary, for repair and maintenance. The emissions control system has an exhaust inlet for receiving diesel engine exhaust and an exhaust outlet for the clean air. The system is further equipped with dampers that are used to allow the exhaust to pass through the system when the ship is at-berth, and can be closed to bypass the system when the ship is at sea.

A method is further provided that allows for ships at berth to use alternative control technique(s) to achieve emission reductions. The method comprises the steps of incorporating an emissions control system within a housing sized to fit within a space allocated for stacked standard shipping containers and connecting the emission control system between the diesel engine exhaust outlet and the exhaust outlet of a ship (i.e., the stacks) via dampers that allow the exhaust from the diesel engine to be passed through the emissions control system and emit regulatory compliant air from the exhaust outlet of the ship when the ship is at-berth by controlling the dampers.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention.

DETAILED DESCRIPTION

As illustrated in FIGS. 1-8, the present invention relates to an emissions control system 100 that is capable of reducing emissions from engines to allow for compliance with applicable regulations governing emissions, such as the requirements of the CARB regulations. As detailed below, the emission control system 100 is a contained system that is able to be loaded and unloaded from a ship using the same hoists as are used for regular shipping containers, facilitating installation and removal, if necessary, of the emissions control system 100 for repair and/or maintenance.

Figure 1:
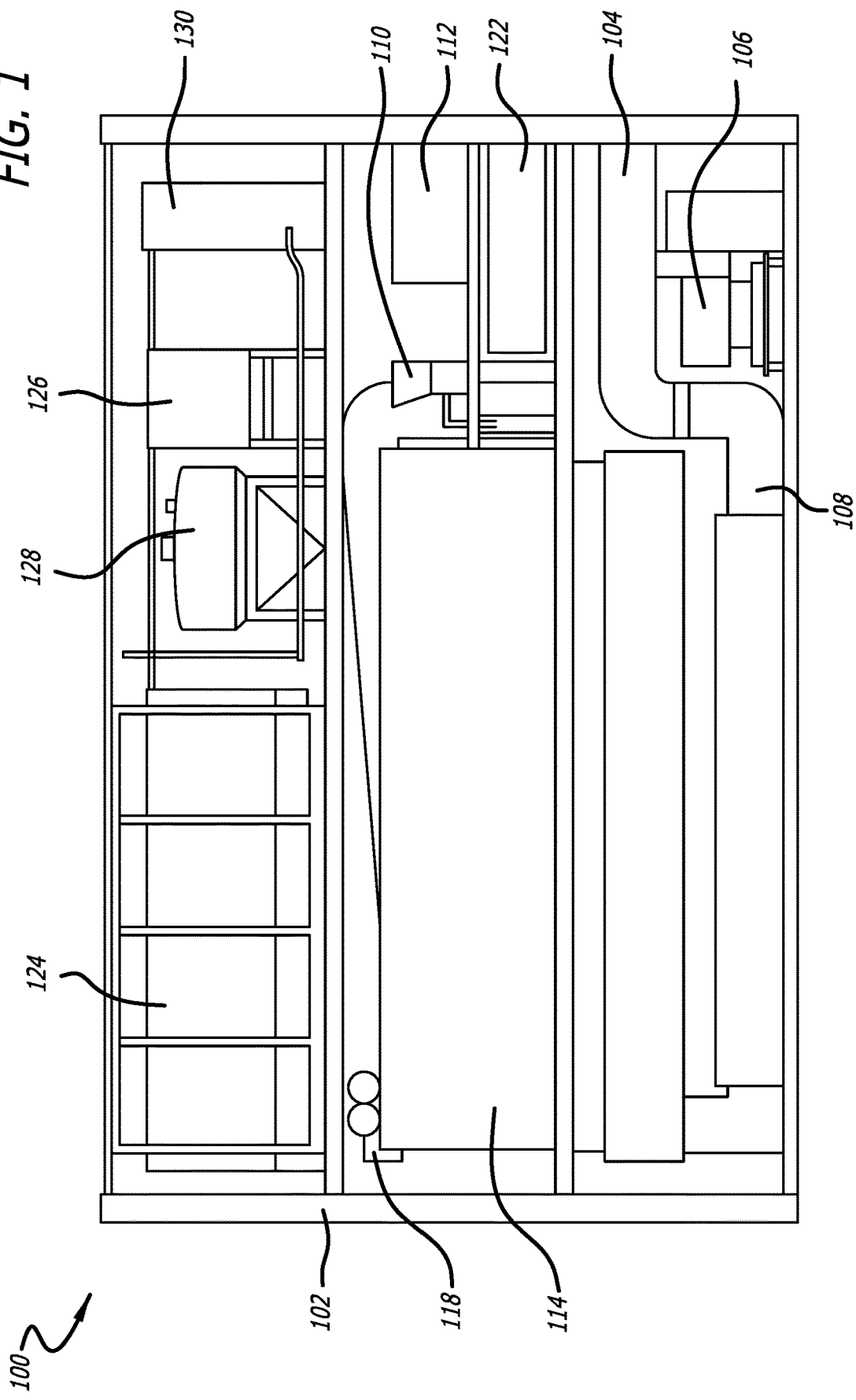
FIG. 1 is a front perspective view of one example of an implementation of the emission control system of the present invention with the housing walls removed.
Figure 2:
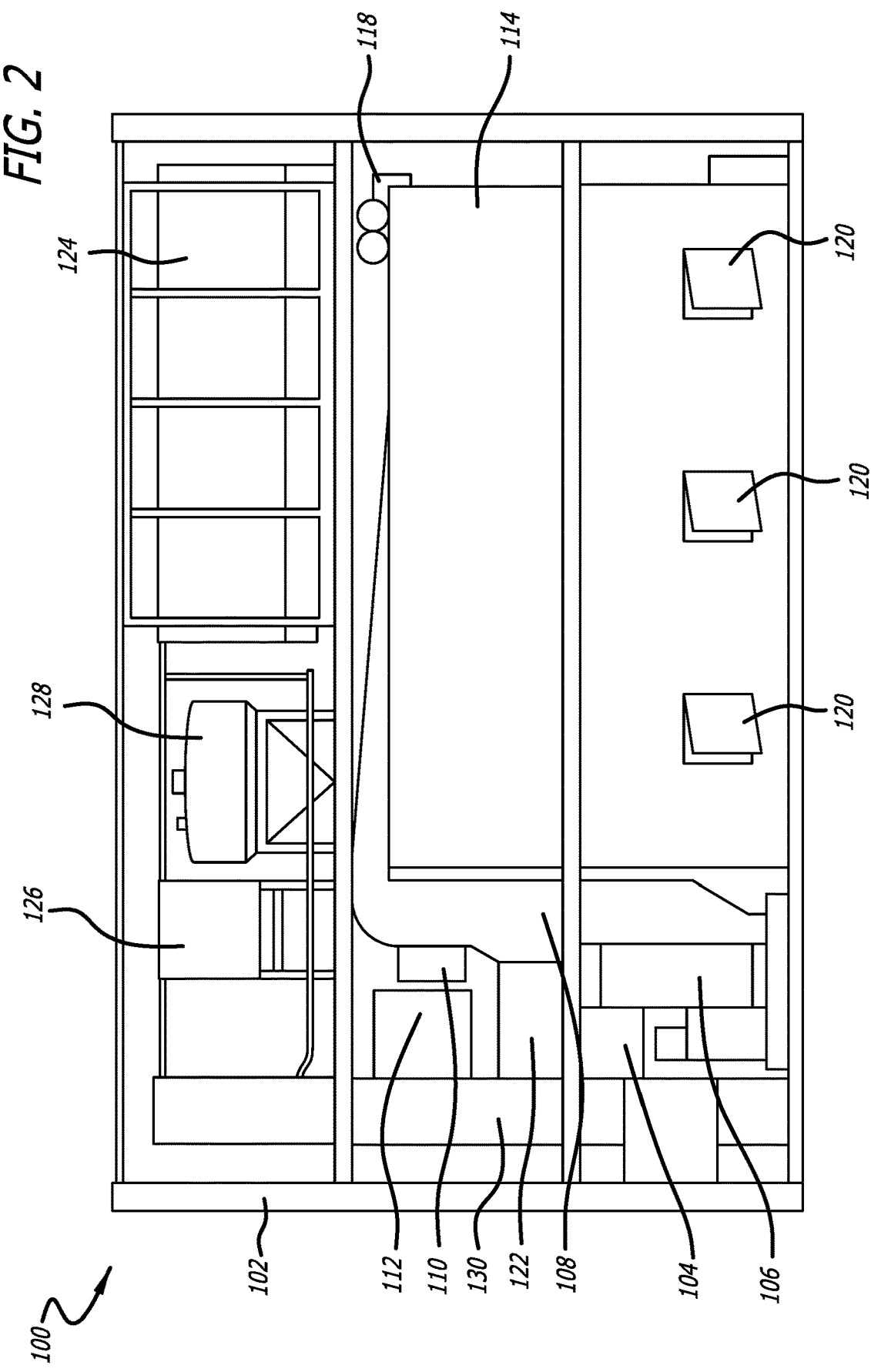
FIG. 2 is a rear perspective of the emission control system of FIG. 1.

FIG. 1 shows a front perspective view of one example of an implementation of the invention, while FIG. 2 shows a back perspective of the same implementation of the invention. The emission reduction system 100 is positioned within a housing 102, the walls of which have been removed for purposes of illustrating the individual components of the emissions control system. The housing 102 is sized to fit within a space allocated for standard stacked shipping containers. In this illustrated example, the housing 102 has an equivalent footprint to a standard shipping container, and is the height of three standard shipping containers. Those skilled in the art will recognize that other sized housings may be used; however, it is desirable for the housing to fit within a space allocated for a shipping container, or stacks of containers.

For example, steel shipping containers come in several different shapes and sizes. The most common shipping containers are standard 20' and 40' long storage containers. Generally, the standard container has an interior height of 7'10" and an exterior height of 8'6". While the most common shipping container is a standard 20' and 40' container, standard containers may vary in length from 10' to 53', approximately 8' feet in width and in height of approximately 8'6" (with some variance by manufacturer). For example, the housing of the present invention may be 40' long, by 8' wide, by 25'6" high.

The housing 102 is installed on the ship in, for example, the ship's container storage area, and is connected to the ship's exhaust system between the diesel engines and the stacks (i.e., the ships exhaust outlet). For example, the emissions control system 100 may be ideally located in the container storage area of the ship that is closest to the engine room, so that it may plug directly into to the ship's power supply and use the ship's compressed air. The system may be connected to the ships components by, for example, quick connect fittings.

When at-berth, the engine exhaust can be run through the emissions control system 100 prior to exiting through the ship's exhaust outlet. The emissions control system 100 can remain in continuous operation while the ship's engines are running. The emissions control system 100 is connected to the ship's exhaust system between the engines and the exhaust outlet and is equipped with dampers (not shown) that allow exhaust to pass through the emissions control system 100 when the ship is at-berth, but that can be closed to bypass the emissions control system when the ship is at sea.

As illustrated by the Figures, the emissions control system 100 may be a hot gas filtration system for exhaust generated by the operation of a ship's auxiliary diesel engine while the ship is at-berth. This implementation of the invention is but one example of a system that reduces emissions and that may be used to meet regulatory requirements, such as the CARB requirements. Those skilled in the art will recognize that any emission control system 100 may be placed within the housing 102 that is able to clean the exhaust without departing from the scope of the invention.

The emission control system 100 takes diesel engine exhaust, subjects it to treatment and releases it as clean air through the stacks of the ship. In the example illustrated by the figures, the emissions control system 100 is configured on three levels within the housing 102: a lower, upper and mid-level.

In the illustrated example, exhaust from the ship's auxiliary engine stack is piped directly into the emission control system 100 through an exhaust inlet 104 mounted on the lowest level of the housing 102 by means of a process fan 106. The exhaust inlet 104 is fitted with dampers (not shown) that permit exhaust from a ship's auxiliary diesel engine to enter the system when the ship is at-berth, and allow exhaust to bypass the system when the ship is at sea.

A utility duct assembly 108 connects directly to the exhaust inlet 104, to which is connected to both a dry sorbent injector system 110 and an aqueous ammonia injector system 112. The utility duct assembly 108 then connects to a ceramic filter housing 114 containing ceramic filter elements 116, upon which is mounted a compressed air blow-down 118. Underneath the filter housing 114 is a waste catch 120. The utility duct assembly 108 then conducts the treated exhaust through an outlet 122 that connects directly to the ship's stack. Storage for aqueous ammonia 124 (e.g., 19% aqueous ammonia), dry sorbent 126 (e.g. sodium bicarbonate, trona or lime) and solid waste 128 are mounted above the ceramic filter housing 114 on the upper level within the housing 102. An access ladder 130 may be mounted on one side of the housing 102, allowing access to all parts of the emission control system 100 and to an equipment monitor (not shown).

Figure 3:
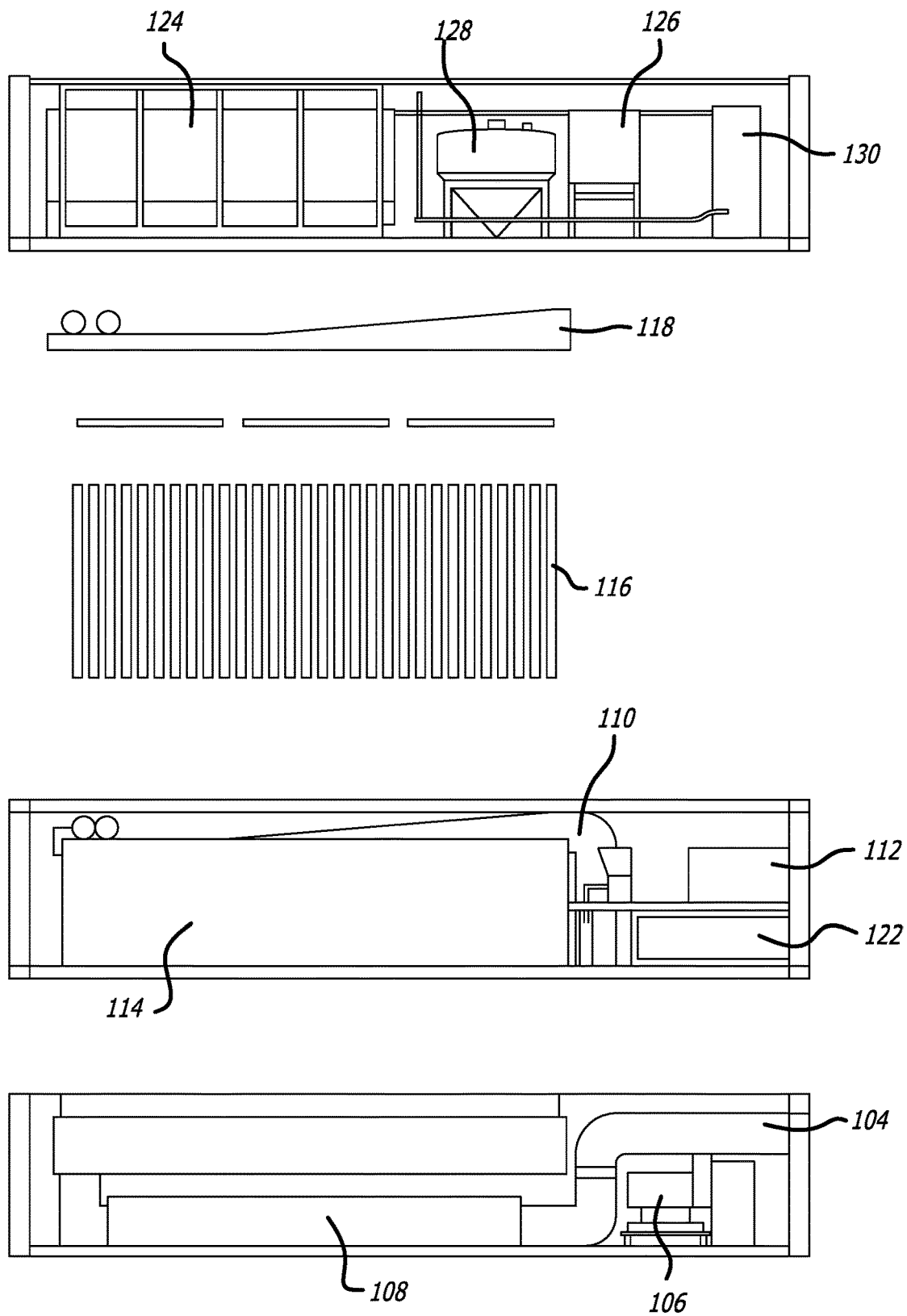
FIG. 3 is an exploded view of FIG. 1.

FIG. 3 is an exploded view of the front of the system 100 illustrated in FIG. 1, without the housing 102. FIG. 3 shows the exhaust inlet 104 and the process fan 106 that draws exhaust into the emissions control system 100, the utility duct system 108, the dry sorbent injector system 110, the aqueous ammonia injector system 112, the ceramic filter housing 114, the ceramic filter elements 116 that are contained within the ceramic filter housing 114, the compressed air blow-down 118, the exhaust outlet 122 that connects to the ship's stack, the aqueous ammonia storage 124, the dry sorbent storage 126 and the storage for solid waste 128 and the access ladder 130.

Figure 4:
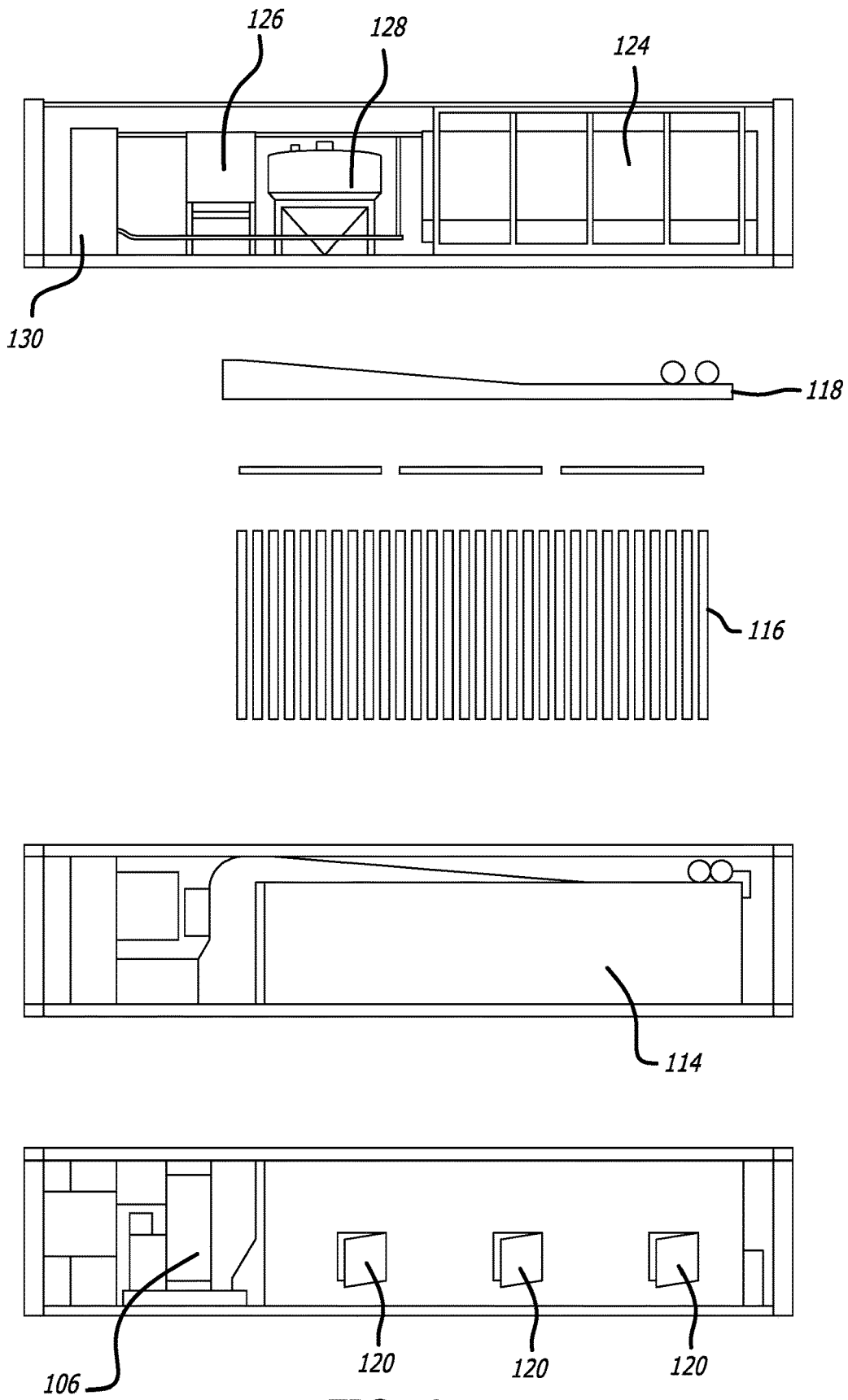
FIG. 4 is an exploded view of FIG. 2.

FIG. 4 is an exploded view of the back of the system 100 illustrated in FIG. 2, without the housing 102. FIG. 4 shows the process fan 106 that draws exhaust into the emissions control system 100, the ceramic filter housing 114, the ceramic filter elements 116 that are contained within the ceramic filter housing 114, the compressed air blow-down 118, the aqueous ammonia storage 124, the dry sorbent storage 126, the storage for solid waste 128 and the access ladder 130.

In operation, exhaust from the auxiliary diesel engine is piped directly into the emission control system 100 through the exhaust inlet 104 once one of the dampers (not shown) is open, ensuring capture of the ship's auxiliary diesel engine exhaust. The exhaust is pulled in through the system using the process fan 106. The exhaust travels through a utility duct assembly 108 that is directly connected to the exhaust inlet 104. While the exhaust is traveling through the utility duct assembly 108, dry sorbent, drawn from the sorbent storage 126, is injected into the exhaust through the sorbent injector system 110. This reacts with $SO_2$, $SO_3$ and HCL to form solid particles that are captured by the ceramic filters 116. In addition, an aqueous ammonia solution is drawn from the aqueous ammonia storage 124 containing an aqueous ammonia solution that is atomized and sprayed into the utility duct assembly 108 by means of the ammonia injection system 112, which turns into a gas and mixes with oxides of nitrogen ($NO_x$) in the exhaust stream. The exhaust stream then enters the ceramic filter housing 114 containing catalyst-embedded ceramic filter elements 116, where the added sorbent continuously deposits on the walls of the ceramic filter elements 116 and serves as the removal zone for particulate matter (PM). Restoring the low-pressure drop to the filter elements is accomplished by periodically sending a pulse of air from a compressed air blowdown 118 into the group of ceramic filter elements 116 while the invention is in operation. The operation causes the outer particle layer that deposit onto the ceramic filter elements 116 to fall off into the waste catch 120 where it is removed and stored in the waste storage 128.

The other gases, including $NO_x$ and ammonia ($NH_3$), penetrate the catalyst-embedded filter elements 116. On the catalyst surface, $NO_x$ is reacted with $NH_3$ and is reduced to diatomic nitrogen ($N_2$) and water vapor. The clean exhaust is then fed directly into the ship's stack by opening one of the dampers (not shown) and closing the others, where it enters the atmosphere.

Figure 5:
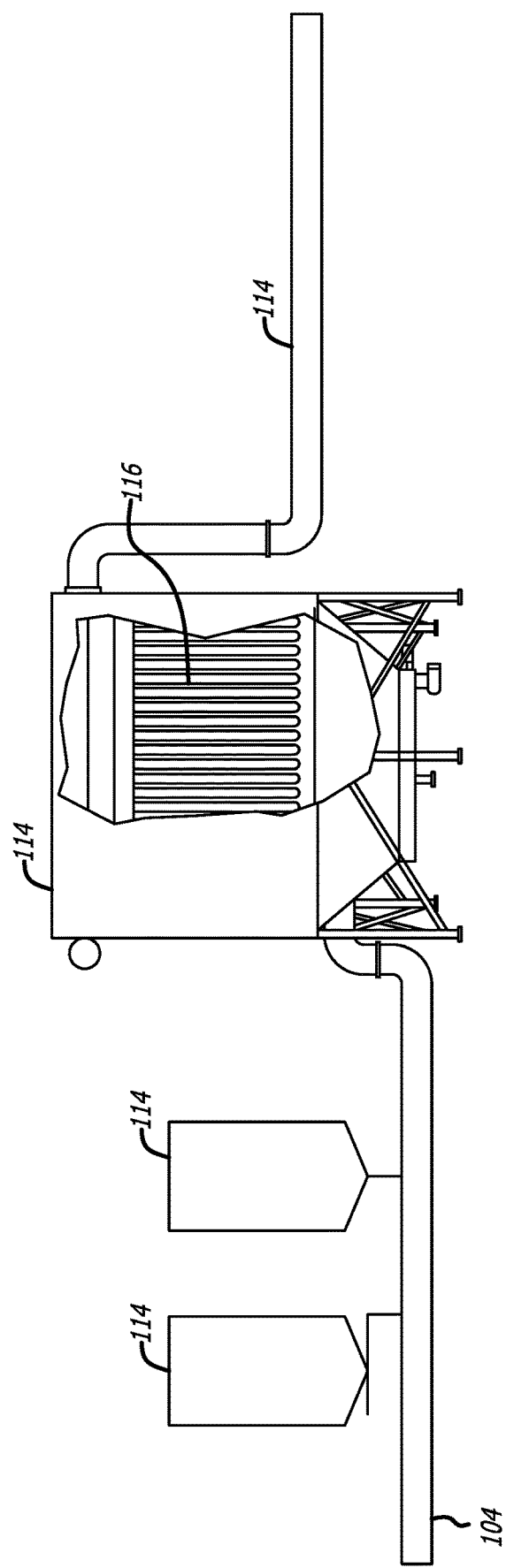
FIG. 5 is one example of the process used by the emission control system of the present invention to treat the collected pollutant gas.

FIG. 5 further illustrates the process by which the collected pollutant gas is treated by the emission control system 100. As illustrated in FIG. 5, pollutant gas passes into the system 100 through an exhaust inlet 104, where dry sorbent is injected into the duct by the sorbent injector system 110, where it immediately starts to react with $SO_2$, $SO_3$ and HCl to form PM that will be captured by the ceramic filter elements 116 located in the ceramic filter housing 114. Aqueous ammonia is atomized and sprayed into the duct by the ammonia injector system 112, where it turns into a gas and mixes with NOx. This mixing is not affected by the process PM or the sorbent. The gas stream then passes into the ceramic filter housing 114, where the process PM and the sorbent are captured on the outside surface of the ceramic filter elements 116. The filters are periodically cleaned with a burst of compressed air from a compressed air blowdown 118 while the filter housing 114 remains online. The NOx and ammonia mixture react on the large surface area of nano-catalysts embedded in the walls of the ceramic filter elements 116. The mixture is free from PM that can blind or poison the catalyst, so the reaction can occur more efficiently and across a much wider temperature range. NOx are broken down into harmless $N_2$ and water vapor, which exit the system through the exhaust outlet 122.

Figure 6:
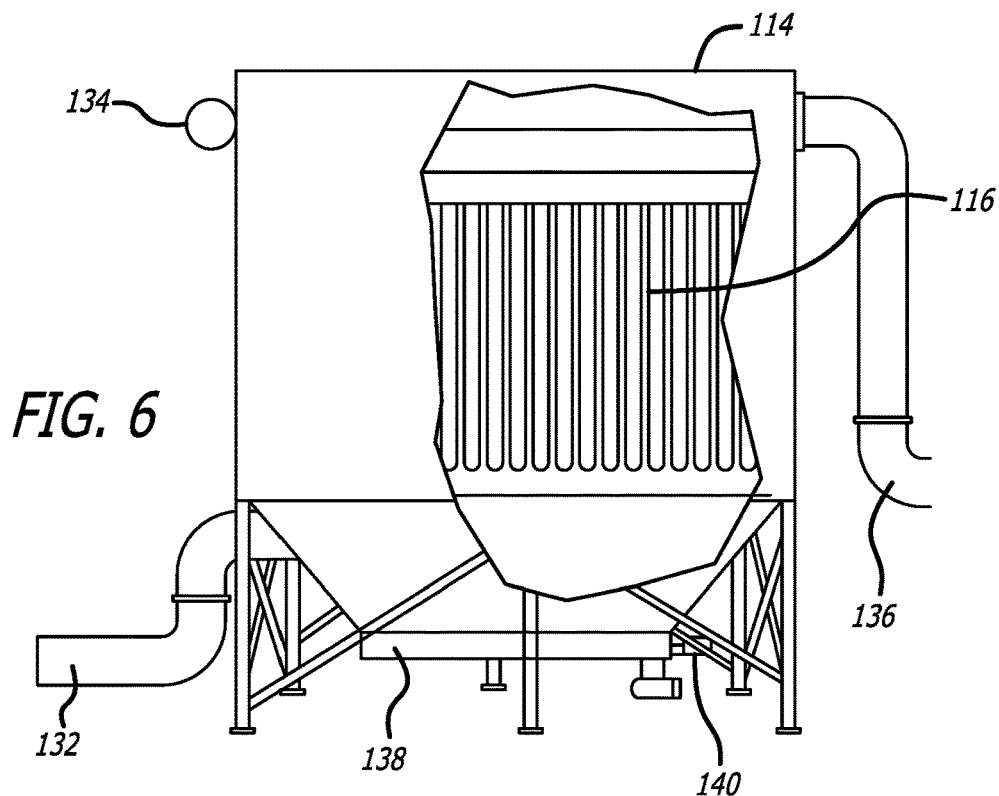
FIG. 6 illustrates examples of ceramic filters arranged in a filter housing of the present invention.

FIG. 6 illustrates the ceramic filter elements 116 of one implementation of the invention 100, arranged in the ceramic filter housing 114, as well as the flow of treated exhaust gas through the ceramic filter housing 114. The exhaust gas, having been injected with dry sorbent and aqueous ammonia, enters the ceramic filter housing 114 at an inlet 132, where it is brought in contact with the ceramic filter elements 116, which are in the shape of elongated tubes arranged vertically within the ceramic filter housing 114. PM and sorbent are captured on the outside surface of these ceramic filter elements 116, which are periodically cleaned with a burst of compressed air from a compressed air blowdown 118 controlled by a compressed air manifold 134 while the filter housing remains online. The NOx and ammonia mixture react on the large surface area of nano-catalysts embedded in the walls of the ceramic filter elements 116. NOx are broken down into harmless $N_2$ and water vapor, which exit through the top of the ceramic filter housing 114 through an outlet 136. A hopper auger 138 collects the PM and sorbent blown down by the compressed air blowdown 118 that periodically cleans the ceramic filter elements 116, moving it into a waste exit 140.

Figure 7:
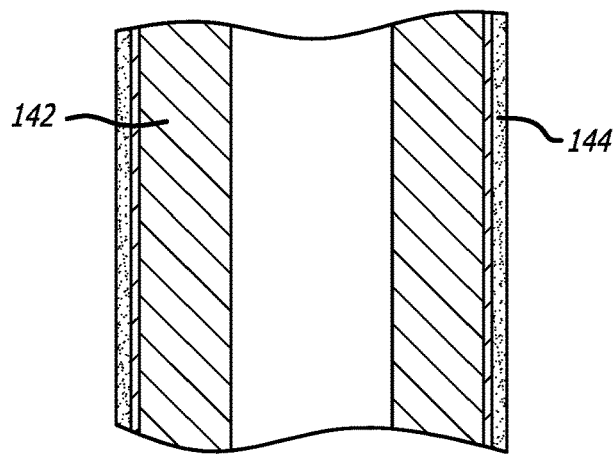
FIG. 7 is a cross-section of one example of a catalyst-embedded filter element of the filter housing of the present invention.

FIG. 7 illustrates a cross-sectional view of one of the ceramic filter elements 116 and depicts the embedded catalyst 142. The ceramic filter element 116 captures most of the PM by inertial impaction, interception, Brownian diffusion and sieving on already collected particles that have formed a dust layer 144 on the ceramic filter element 116. The added sorbent continuously deposits on the walls of the ceramic filter element 116 and serves as the removal zone for the PM particles.

A different mechanism is used for removal of $NO_x$. The $NO_x$ removal process is a catalytic process that combines the material used for making the ceramic filter element 116 with proprietary catalysts used in commercial selective catalytic reduction (SCR) systems. On the catalyst surface, $NO_x$ is reacted with $NH_3$ and is reduced to diatomic nitrogen and water vapor.

A method for treating exhaust from auxiliary diesel engines operated by ocean-going ships at-berth is also provided by the present invention. The method includes the step of providing a containerized exhaust treatment system that is installed on the ship in the ship's container storage area that can remain in continuous operation while the ship's engines are running. The method comprises the steps of incorporating an emissions control system 100 within a housing 102 sized to fit within a space allocated for stacked standard shipping containers, connecting the emission control system 100 between the diesel engine exhaust outlet and the exhaust outlet of the ship (i.e., the stacks) using dampers that allow the exhaust from the diesel engine to be passed through the emissions control system and emit regulatory compliant air from the exhaust outlet of the ship when the ship is at berth by controlling the dampers.

While the above descriptions are described in operation with the auxiliary engines of the ship, the system may be used with any of the ships engines. Further, the system may draw power and compressed air from the ship for use by connection to the ship's systems using quick connecting fittings. Dampers, while not shown, may be connected at various points along the route traveled by the diesel exhaust into and out of the emissions control system so as to permit the exhaust to either: (i) be directed into the system, treated by the system and then expelled into the ship's stack; or (ii) bypass the emissions control system and pass directly into the ship's stack.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the invention could be mounted on a barge and floated to the ship at-berth. The claims and their equivalents define the scope of the invention.

What is claimed is:

1. A method for filtering exhaust from a ship having a diesel engine and an exhaust stack outlet to achieve emission reductions, the method comprising the steps of:
    (a) incorporating an emissions control system within a housing having a length, width and height, an upper level and a lower level, where the emissions control system comprises a filter, a waste catch positioned on the lower level for capturing deposits that fall off the filter, an access ladder for allowing access to the upper and lower level, an exhaust inlet and an exhaust outlet, where the exhaust inlet has at least one damper;
    (b) connecting the exhaust inlet of the emissions control system to the ship's diesel engine exhaust such that the exhaust inlet of the emissions control system receives the diesel engine exhaust for filtering the ship's diesel engine exhaust to produce a filtered exhaust;

(c) connecting the exhaust outlet of the emissions control system to the ship's diesel engine exhaust stack outlet such that the ship's exhaust stack outlet emits the filtered exhaust that is emitted from the exhaust outlet of the emissions control system; and (d) positioning the at least one damper between the exhaust inlet of the emissions control system and the diesel engine for allowing the ship's diesel engine exhaust to bypass the emissions control system and exit directly through the ship's exhaust stack outlet without first being filtered, allowing both the filtered and unfiltered diesel engine exhaust to exit through the ship's exhaust stack outlet.

2. The method of claim 1 where the damper permits the exhaust from the ship's diesel engine to enter the emissions control system when the ship is at-berth and allows the exhaust from the ship's diesel engine to bypass the emissions control system when the ship is at sea.

3. The method of claim 1 where the housing has the length and width of a shipping container, where the length of the housing ranges in length from 10 feet to 53 feet and is approximately 8 feet wide.

4. The method of claim 3 where the housing has the height of three shipping containers, where the housing is approximately 25.5 feet high.

5. The method of claim 1 where the housing of the emissions control system is configured to fit within a space allocated for a shipping container.

6. The method of claim 5 where the emissions control system is connected to the ship's components by quick connect fittings.

7. The method of claim 1 where the filter is ceramic.

8. The method of claim 1 where the housing is configured to be moved as a single unit by a shipping container hoist.

9. The method of claim 1 where the access ladder is positioned on one side of the housing.

10. The method of claim 8 where the method further includes the step of installing the housing of the emissions control system on the ship such that the housing is able to be loaded and unloaded from the ship by the shipping container hoist.

11. A method for filtering exhaust from a ship having a diesel engine and an exhaust stack outlet to achieve emission reductions, the method comprising the steps of:

(a) incorporating an emissions control system within a housing having an upper level and a lower level, and where the emissions control system comprises a filter, a waste catch positioned on the lower level for capturing deposits that fall off the filter, an access ladder for allowing access to the upper and lower level, an exhaust inlet and an exhaust outlet; and (b) connecting the exhaust inlet of the emissions control system to the ship's diesel engine exhaust, where the exhaust inlet includes at least one damper that can move between a first position and a second position and where the damper, when in its first position, directs the ship's diesel engine exhaust to be received and filtered by the emissions control system prior to being received by the ship's exhaust stack outlet and where the damper, when in its second position, directs the ship's diesel engine exhaust to bypass the emissions control system such that the diesel engine exhaust is not filtered by the emissions control system prior to being received by the ship's exhaust stack outlet, and where, when the damper is in its first position, causes the ship's filtered diesel engine exhaust to exit through the ship's exhaust stack outlet, and where, when the damper is in its second position, causes the ship's unfiltered diesel engine exhaust to exit through the ship's exhaust stack outlet.

12. The method of claim 11 where the damper permits the exhaust from the ship's diesel engine to enter the emissions control system when the ship is at-berth and allows the exhaust from the ship's diesel engine to bypass the emissions control system when the ship is at sea.

13. The method of claim 11, where the housing of the emissions control system is configured to fit within a space allocated for a shipping container.

14. The method of claim 13 where the emissions control system is connected to the ship's components by quick connect fittings.

* * * * *